United States Patent [19]

Lakra et al.

[11] 4,293,383

[45] Oct. 6, 1981

[54] NUCLEAR REACTOR WITH EQUIPMENT FOR PREVENTING CONVECTION OF METAL VAPORS

[75] Inventors: Ruhama J. Lakra, Cologne; Jürgen Freund, Bonn-Bad Godesberg; Gerd Rauschert, Bergisch Gladbach, all of Fed. Rep. of Germany

[73] Assignee: Interatom, Internationale Atomreaktorbau GmbH, Bergisch Gladbach, Fed. Rep. of Germany

[21] Appl. No.: 884,115

[22] Filed: Mar. 7, 1978

[30] Foreign Application Priority Data

Mar. 8, 1977 [DE] Fed. Rep. of Germany ....... 2709914

[51] Int. Cl.³ .............................................. G21C 13/06
[52] U.S. Cl. .................................... 376/290; 376/352
[58] Field of Search ...................... 176/37, 38, 40, 65, 176/87

[56] References Cited

FOREIGN PATENT DOCUMENTS 1559181  1/1969  France .................................. 176/37
1210048 10/1970  United Kingdom .................. 176/37

*Primary Examiner*—S. A. Cangialosi
*Attorney, Agent, or Firm*—Herbert L. Lerner

[57] ABSTRACT

A liquid metal-cooled nuclear reactor has a reactor vessel with a cover at the top thereof and is partly filled with liquid metal up to a given surface level, the liquid metal surface and the reactor-vessel cover defining therebetween a gas-filled space, at least one quasi-tight convection barrier being disposed in the space and subdividing it in elevation.

3 Claims, 1 Drawing Figure

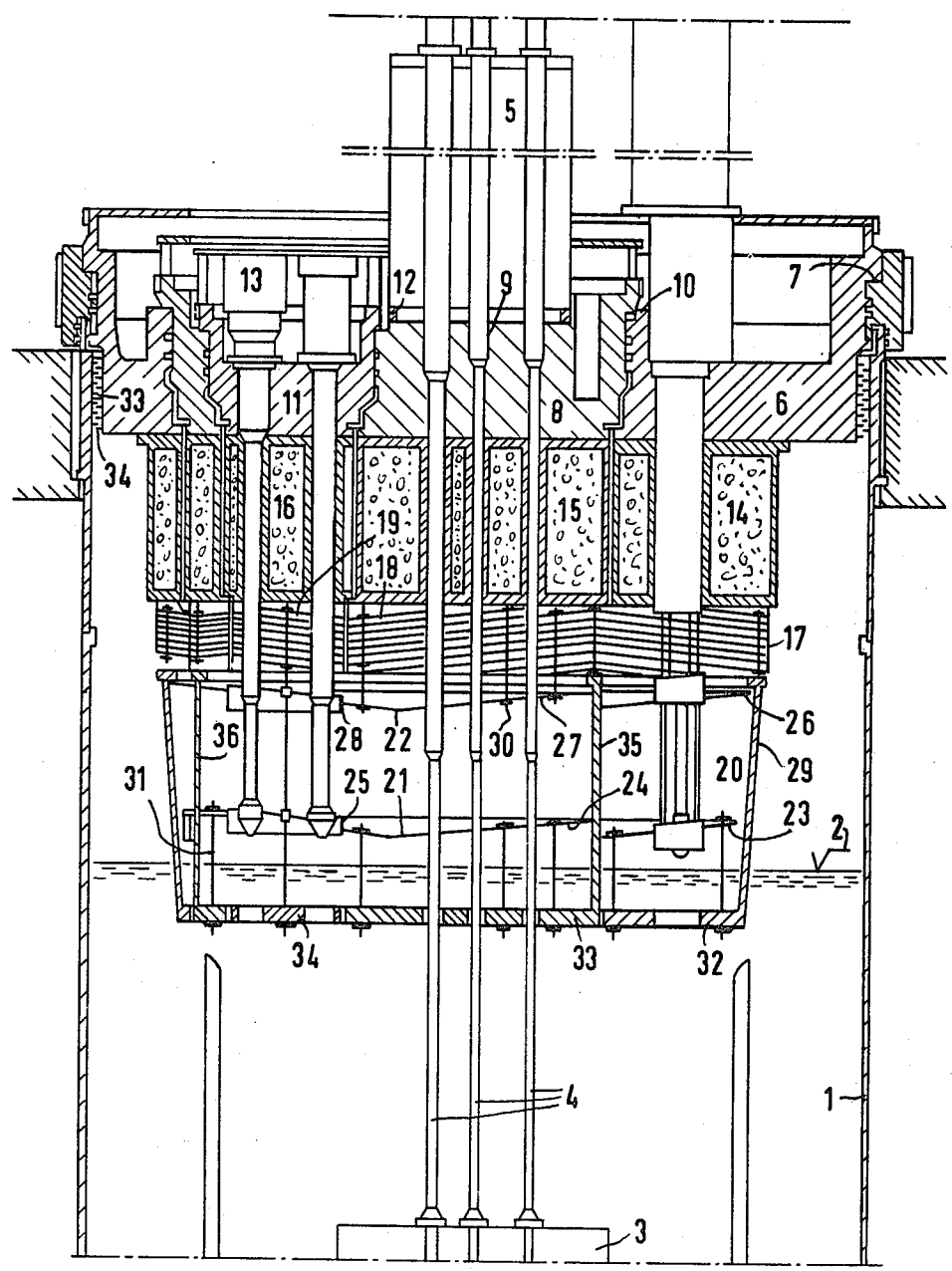

NUCLEAR REACTOR WITH EQUIPMENT FOR PREVENTING CONVECTION OF METAL VAPORS

The invention relates to a nuclear reactor with equipment for preventing convection of metal vapors and, more particularly, to a liquid metal-cooled nuclear reactor with devices for preventing the convection of metal vapors and aerosols from the surface of the liquid metal to such parts of the reactor vessel and installations thereof on which the liquid metal can condense. It has been found that during operation of nuclear reactors cooled by liquid metal, especially liquid sodium, large quantities of metal vapors and aerosols are formed in the protective-gas atmosphere of the reactor. As a result, the lower layers of the protective-gas atmosphere are heated up especially intensely due to the hot coolant located therebelow, whereas the upper parts of the protective-gas atmosphere and the walls bordering thereon, for example the cover of the reactor, are at a considerably lower temperature. Due to this temperature distribution, upwardly directed flows occur in the protective-gas atmosphere, because of which, saturated metal vapors come into contact with the relatively cool surfaces of the nuclear reactor pressure vessel and installations or equipment therein, where they can deposit and, under certain conditions, in fact, "freeze" to solid metal. The functional capability of essential parts of the nuclear reactor, such as the control rods and the rotation of the reactor cover, for example, can thereby be greatly impeded. In the most favorable case, this requires costly accompanying or auxiliary heating at the endangered location in order to re-melt the metal. The conditions are even more unfavorable, if the condensate is not pure metal, but rather, reaction products thereof, such as oxides, for example. Such reaction products are not removable even by heating. It is therefore desirable to prevent the transport of such metal vapors and aerosols in the protective-gas atmosphere which requires that consideration be given to the necessity of providing a relatively large free space between the liquid-metal surface in the reactor vessel and the cover of the reactor vessel for manipulation or handling devices and instrumentation.

In order to protect at least the gap located between a reactor rotary cover and the opening in the reactor vessel associated therewith from penetration by metal vapors for reasons of production technology and thermal engineering, there has been proposed heretofore, in German Published Non-Prosecuted Application DT-OS No. 1 813 820, to have the cover lie tightly on a flange ring acting as a type of valve seat which is provided on a reactor vessel, so that the gap is protected from penetration by metal vapors, and the cover, only when required, is lifted sufficiently by means of special lifting devices so as to permit turning or rotation thereof. Since the rotary cover must be provided with an especially effective radiation shield for safety reasons, it has considerable weight, and the lifting devices must have a correspondingly strong construction. In addition thereto, an embodiment disclosed in the aforementioned German published application affords protection only for the cover gap and not, however, for the other structural members disposed below the cover gap in the protective-gas atmosphere. From U.S. Pat. No. 3,548,931, it has furthermore become known heretofore to disposed a nuclear reactor within a double tank having rotary covers closing only the outer tank thereof, and the nuclear reactor per se i.e. the fission zone as well as any possible heat exchangers, being disposed penetrating the inner tank. These penetrations or so-called "pass-throughs" are substantially sealed by numerous, mutually overlapping metal sheets or plates secured partly to the reactor vessel and partly to the installations or equipment therein. In order to prevent penetration by metal vapor-bearing protective gas through these gaps, there is proposed in this U.S. patent to fill the annular space between the tanks with pure protective gas under elevated pressure which maintains a flow that is directed into the inner tank through these gaps. This heretofore known construction requires, however, in addition to a second tank or vessel, a further expense in the form of pumps as well as a necessity for removing protective gas periodically from the inner tank and purifying it.

It is accordingly an object of the invention to provide a nuclear reactor with equipment for preventing convection of metal vapors which avoids the disadvantages of the hereinaforementioned prior-art equipment of this general type.

More specifically, it is an object of the invention to provide a device operating without moving parts for preventing convection of metal vapors and aerosols to coller parts of the nuclear reactor.

With the foregoing and other objects in view, a special subdivision of the protective-gas space is provided. Thus, in accordance with the invention, in a liquid metal-cooled nuclear reactor having a reactor vessel partly filled with liquid metal up to a given surface level and at least one part to be protected located above and spaced from the surface level of the liquid metal, the space therebetween being filled with protective gas, one or more quasi-tight convection barriers are disposed in the space and subdivide it in elevation. The barriers are in the form of metal sheets or plates mounted in mutually spaced relationship, and the part to be protected is, for example, the cover of the reactor vessel located at the top thereof. This type of device requires only a limited construction expense and is also quite nonsensitive during operation; nevertheless, the transport of liquid metal to the cooler parts of the device produced by convection is largely halted, although between the edges of the barriers and the inner wall of the vessel, as well as at the openings required for the pass-throughs of control rods, manipulation or handling devices and the like, gaps exist which have a width that excludes obstruction or clogging by deposits therein.

In accordance with another feature of the invention, the convection barriers have a conical construction and, in fact, such that the point of the cone is located nearly in the middle of the protective-gas space. A more advantageous type of flow is achieved thereby and, moreover, permits the inclined surface of the metal sheets to provide easier run-off of the liquid metal deposited thereon to the lowermost location thereof from which the deposited liquid metal can drip off into the liquid-metal plenum of the reactor.

In accordance with a further feature of the invention wherein the nuclear reactor is provided with a reactor-vessel cover formed of a plurality of rotary cover members encased within one another and movable independently of one another each of the convection barriers is formed of a plurality of individual metal sheets which are substantially congruent i.e. at the edges, the smaller metal sheets somewhat overlap the larger ones surrounding them with the respective rotary cover member (to which they are suitably fastened) and are rotatable coaxially therewith. The pass-through for the installations or equipment, such as the control rods or the manipulation devices, fastened to the rotary covers presents no problems, especially since varying thermal expansions also become equalized.

When the reactor vessel and the cover are separated by a gap, there are provided, in accordance with a concomitant feature of the invention, one or more pairs of annular metal plates or sheets disposed in the gap in mutually overlapping relationship and being alternatingly secured to the reactor vessel and to the cover.

Other features which are considered as characteristic for the invention are set forth in the appended claims.

Although the invention is illustrated and described herein as embodied in a nuclear reactor with equipment for preventing convection of metal vapors, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying single feature of the drawing which is a fragmentary longitudinal sectional view of a liquid metal-cooled nuclear reactor in accordance with the invention.

Referring now to the drawing, there is shown therein, within a reactor vessel 1 filled up to a level 2 with liquid metal, such as sodium in this instance, a fission zone 3, the power liberation of which is controlled with the aid of control rods 4 which can be moved upwardly and downwardly, in a conventional manner, by control rod drives 5. The reactor vessel 1 is closed at the top thereof by a cover 6 which is rotatable on bearings 7 with the aid of a suitable non-illustrated drive. Within the rotary cover 6 and eccentric to the central axis thereof, a second rotary cover 8 is disposed, formed with openings 9 therein in which the control rods 4 are guided, the second rotary cover 8 being rotatable on bearings 10 with the aid of a suitable non-illustrated drive. Within the second rotary cover 8 and eccentric to the central axis thereof, a third rotary cover 11 is disposed which is rotatable on bearings 12 by means of a suitable non-illustrated drive and, in which, devices 13 of conventional construction are installed, with the aid of which fuel elements are inserted into and can be lifted out of the fission zone 3. Through suitable turning of the covers 6, 8 and 11, the devices 13 can be positioned over each individual element of the fission zone 3. The control rods 4 are divisible in a manner that the lower parts thereof containing absorbers, which are not shown in the FIGURE, remain in the fission zone 3 when the upper parts thereof are rotated aside or removed with the second rotary cover 8. The rotary covers 6, 8 and 11 are provided with shieldings 14, 15 and 16, respectively, at the underside thereof. To protect them from the thermal radiation of the coolant, the shieldings 14, 15 and 16 are provided, in turn, at the underside thereof, with packets of heat insulating metal plates or sheets 17, 18 and 19, respectively. The space 20 between the coolant level 2 and the underside of the rotary covers 6, 8 and 11 is filled with an inert protective gas, such as argon, for example. The argon contains a considerable amount of liquid metal vapors and aerosols which can penetrate, for example, into the gap between the rotary cover 6 and the reactor vessel 1, into the gaps between the individual rotary covers 6, 8 and 11 or into the passageway openings 9 for the control rods 4. Since these parts are at relatively low temperature, condensation of metal vapors or deposition of impurities, such as metal oxides, from the argon can occur, which can endanger the bearings 7, 10 and 12, for example, and consequently the mobility of the rotary covers 6, 8 and 11 or also the mobility of the control rods 4. This danger is aggravated by convection which is inevitably produced in the intermediate space 20 above the liquid-metal surface level 2 from the temperature reducing therein in accordance with the height. To check or block this convection, two convection barriers 21 and 22 in accordance with the invention are installed. The lower convection barrier 21 is formed of three individual metal sheets or plates 23, 24 and 25, and the upper convection barrier of three individual metal sheets or plates 26, 27 and 28. The metal sheets 24 and 27 have substantially the same outline or profile as that of the second rotary cover 8, and the metal sheets 25 and 28 substantially that of the third rotary cover 11, while the metal sheets 23 and 26 cover the cross-sectional area remaining thereabove within a lateral limiting or boundary wall 29. The metal sheets 26, 27 and 28 are suspended by rods 30 from the respective rotary covers 6, 8 and 11 and are turned or rotated therewith so that the mobility of the control rods 4 and the fuel-element exchanging devices 13 is not hindered or impeded. The metal sheets 23, 24 and 25 are supported by rods 31 on an immersion plate formed of three individual parts 32, 33 and 34 which are coaxial to the rotary covers 6, 8 and 11, the immersion plate 32, 33, 34 being disposed at an even level below the coolant level 2 and being formed with openings through which the control rods 4 are guided, as well as having attached thereto conventional non-illustrated measuring instruments for monitoring the fission zone 3. The individual plates 32, 33 and 34 are fastened by means of suspension constructions or walls 29, 35 and 36, respectively, to the respective rotary covers 6, 8 and 11. The metal sheets 23, 24 and 25 as well as 26, 27 and 28 have an inclined or conical construction so that liquid metal condensing thereon can drip off more easily in that it flows to the lowest locations or points of the metal sheets and accumulate there. The metal sheets are, furthermore, constructed so as to overlap somewhat at the marginal edges thereof in order to keep the gaps, which tend to promote the convection, as small as possible. In the especially wide gap between the rotary cover 6 and the reactor vessel 1, a row of further metal sheets 33 (fastened to the reactor vessel 1) and 34 (fastened to the rotary cover 6) are disposed which, comb-like and partly overlapping one another, are in mutual engagement and are additionally conducive to stopping convection from delivering metal vapors into this gap.

We claim:

1. In a liquid metal-cooled nuclear reactor having a reactor vessel with a cover at the top thereof and being partly filled with liquid metal up to a given surface level, the liquid metal surface and the reactor-vessel cover defining therebetween a gas-filled space, at least one convection barrier permeable to the gas being disposed in said space and subdividing said space into at least two parts, the parts of said space having respective thermal flow systems therein, said convection barrier being of conical construction and extending across substantially an entire horizontal sectional area of the reactor vessel.

2. Nuclear reactor according to claim 1 wherein the reactor-vessel cover is formed of a plurality of rotary cover members encased within one another and movable independently of one another, and including a plurality of the convection barriers disposed in said space, each of said convection barriers being formed of a plurality of individual metal sheets substantially congruent with the respective rotary cover members and rotatable coaxially therewith.

3. Nuclear reactor according to claim 1 wherein the reactor vessel and the cover have a gap therebetween, and at least one pair of annular metal plates disposed in said gap in mutually overlapping relationship and being alternatingly secured to the reactor vessel and to the cover.

* * * * *